(12) United States Patent
Haneda et al.

(10) Patent No.: US 9,329,389 B2
(45) Date of Patent: May 3, 2016

(54) PROJECTION TYPE DISPLAY DEVICE FOR VEHICLES

(71) Applicant: DENSO CORPORATION, Kariya, Aichi-pref. (JP)

(72) Inventors: Narihiro Haneda, Nagoya (JP); Makoto Sakai, Kitanagoya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 14/312,826

(22) Filed: Jun. 24, 2014

(65) Prior Publication Data

US 2015/0009573 A1 Jan. 8, 2015

(30) Foreign Application Priority Data

Jul. 2, 2013 (JP) .................................. 2013-138778

(51) Int. Cl.
*G02B 27/14* (2006.01)
*G09G 5/00* (2006.01)
*G02B 27/01* (2006.01)

(52) U.S. Cl.
CPC ............ *G02B 27/0101* (2013.01); *G02B 27/01* (2013.01)

(58) Field of Classification Search
CPC ............................ G02B 27/01; G02B 27/0101
USPC ........................ 359/630, 633; 345/7
See application file for complete search history.

(56) References Cited

U.S. PATENT DOCUMENTS

2005/0168695 A1 8/2005 Ooba et al.
2012/0262673 A1 10/2012 Larsson

FOREIGN PATENT DOCUMENTS

JP 2007-331506 A 12/2007

OTHER PUBLICATIONS

Office Action mailed Jun. 16, 2015 in the corresponding JP application No. 2013-138778 (English translation attached).
U.S. Appl. No. 14/312,846, filed Jun. 24, 2014, Haneda et al.

*Primary Examiner* — William Choi
(74) *Attorney, Agent, or Firm* — Posz Law Group, PLC

(57) ABSTRACT

A projection type display device configured to display an image on a window while also providing a view through the window. The projection type display device has a plurality of reflection portions arranged on a windshield for reflecting an image light that is projected from an image projection device and displaying a superposed display image onto the windshield. Further, since (i) the plurality of reflection portions are arranged on the window along a lateral direction with a lateral interval interposed at positions between two reflection portions, (ii) a lateral width of each of the plurality of reflection portions is less than the minimum human pupil diameter, and (iii) the lateral interval between the two reflection portions is equal to or greater than the lateral width of the reflection portion, the view of the vehicle occupant through the windshield is also sufficiently ensured.

14 Claims, 4 Drawing Sheets

PROJECTION TYPE DISPLAY DEVICE FOR VEHICLES

CROSS REFERENCE TO RELATED APPLICATION

The present application is based on and claims the benefit of priority of Japanese Patent Application No. 2013-138778, filed on Jul. 2, 2013, the disclosure of which is incorporated herein by reference.

TECHNICAL FIELD

The present disclosure generally relates to a projection type display device for displaying an image by projecting light on a window within a vehicle compartment.

BACKGROUND INFORMATION

A patent document 1 (i.e., Japanese Patent Laid-Open No. 4280648) discloses a projection type display device which displays an image by projecting an image light onto a predetermined region of a vehicle compartment. The above-described predetermined region is a surface of a front pillar on a side of the vehicle compartment. The projection type display device of the patent document 1 projects an image light onto the surface of the front pillar to display an image on such surface.

The window which constitutes a part of a vehicle compartment provides a field of view for the vehicle occupant. The transparency of the window provides a view of an outside of the vehicle through the window and does not obstruct or obscure the view of the occupant. Further, in addition to having a view of the outside through the window, it is also desired to display an image on the same window.

However, the projection type display device of the patent document 1 mentioned above cannot be used to provide such a display function because the image cannot be displayed on a transparent window. In contrast, in the patent document 1, the surface of the front pillar upon which the projection type display device projects the image light is opaque.

SUMMARY

It is an object of the present disclosure to provide a projection type display device which is capable of displaying an image upon a transparent window.

In an aspect of the present disclosure, a projection type display device for vehicles includes a plurality of reflection portions arranged on the window and reflecting a light. The plurality of reflection portions are separated by a lateral interval interposed between the plurality of reflection portions. An image projection device projects an image light for displaying an image on the plurality of reflection portions. Each of the plurality of reflection portions is configured to have a lateral width being equal to or less than 2 mm, and the lateral interval between the plurality of reflection portions is equal to or greater than the lateral width of each of the plurality of reflection portions.

According to the above-described disclosure, since the plurality of reflection portions is arranged on the window which constitutes the vehicle compartment, an image can be displayed on the window by reflecting the image light from the image projection device on the plurality of reflection portions. Further, since (i) the plurality of reflection portions are laterally arranged on the window along a lateral direction, with the lateral interval interposed at positions between two reflection portions, and, (ii) the lateral width of each of the plurality of reflection portions is less than 2 mm in accordance with the minimum human pupil diameter, which is substantially 2 mm in a light place (i.e., since the pupil diameter of a light-adapted eye is known to be equal to or less than 2 mm), and (iii) the lateral interval between the reflection portions is equal to or greater than the lateral width of the reflection portion, the view of the vehicle occupant through the window is sufficiently ensured.

BRIEF DESCRIPTION OF THE DRAWINGS

Objects, features, and advantages of the present disclosure will become more apparent from the following detailed description made with reference to the accompanying drawings, in which.

DETAILED DESCRIPTION

Figure 1:
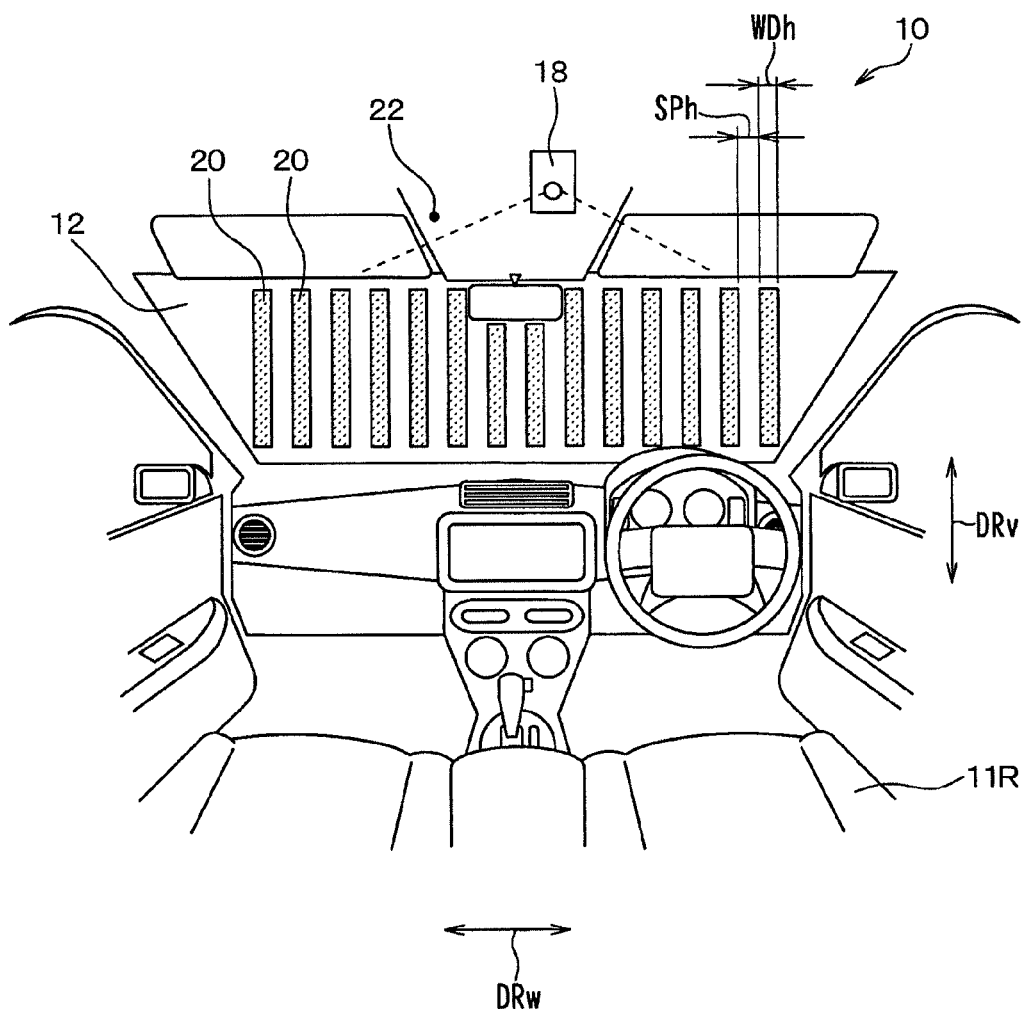
FIG. 1 is an illustrated configuration of a projection type display device in a first embodiment of the present disclosure, which also illustrates a view from an inside of a vehicle compartment toward a front field.

Hereafter, embodiments of the present disclosure are described based on the drawings. In the following embodiments, the same numerals basically represent the same components in the drawings.

(First Embodiment)

FIG. 1 shows an illustration of an outline configuration of a projection type display device 10 of the first embodiment, together with a view of a front field, i.e., a view from an inside of a vehicle compartment toward a front field of the vehicle. The projection type display device 10 in FIG. 1 is a display device for vehicles, and, more specifically, is a device for displaying a superimposed display image in a superposed manner, i.e., on top of a view of an outside of the vehicle, or on a scenery observed from the vehicle, which is actually on a view through a windshield 12 which constitutes a part of a vehicle compartment as one of many windows of the compartment. The superimposed display image is an image relevant to the scenery, or a scene outside of the vehicle. For example, the projection type display device 10 displays a superimposed display image which may put an emphasis on a road sign, which is visible for an occupant in the vehicle compartment through the windshield 12, in a shape that circles around the road sign.

The projection type display device 10 includes, as shown in FIG. 1, (i) an image projection device 18 that serves as a projector which projects an image light onto the windshield 12 and (ii) a plurality of reflection portions 20 which are arranged on the windshield 12 and reflect light.

The image projection device 18 is a laser projector which emits a laser beam and displays an image. That is, the image projection device 18 scanningly projects the laser beam which is an image light for displaying the above-described superimposed display image on the windshield 12. Therefore, the superimposed display image which is comprised of the image light reflected by the plurality of reflection portions 20 appears to be displayed on the windshield 12 for a vehicle occupant in the vehicle compartment, i.e., for a viewer of such superimposed display image. The image projection device 18 may be installed, for example, at a center of a vehicle ceiling 22 on a front side, for projecting the image light on an entire surface of the windshield 12.

The windshield 12 is a transparent glass plate, which constitutes a window of the vehicle compartment. A vehicle occupant in the vehicle compartment can see a front field of the vehicle through the windshield 12.

The plurality of reflection portions 20 are respectively made of a film-like reflector which reflects light, and is fixedly disposed on a vehicle compartment side of the windshield 12, or is printed thereon of the windshield 12. The plurality of reflection portions 20 comprises a diffuse reflection material which diffuses a reflection of the light.

Each of the plurality of reflection portions 20 has, as shown in FIG. 1, a rectangular shape extending along a vertical direction of the windshield 12, or, in other words, in the shape of strips. Further, the plurality of reflection portions 20 are attached onto the windshield 12 along the lateral direction of the windshield 12. The plurality of reflection portions 20 is disposed with an interval SPh interposed therebetween along the lateral direction of the windshield 12. In other words, the plurality of reflection portions is separated by an interval (SPv) along the vertical direction of the window. Further, the vertical direction of the windshield 12 is a direction along a glass surface of the windshield 12, which is an up-down direction of the vehicle, and is designated as a direction DRv. Further, the lateral direction of the windshield 12 is a vehicle width direction DRw along the glass surface of the windshield 12.

More concretely, along the lateral direction of the windshield 12, the width of the reflection portion 20, i.e., the width WDh, is defined to be equal to or less than 2 mm. This is because the minimum human pupil diameter is about 2 mm when in a light place. That is, the width WDh is defined as a matching dimension as the minimum human pupil diameter or smaller. Further, the interval SPh between the reflection portions 20 along the lateral direction of the windshield 12 is equal to or greater than the width WDh of the reflection portion 20.

Since the width WDh and the interval SPh of the reflection portion 20 are defined based on a relationship with the minimum human pupil diameter, the vehicle occupant in the vehicle compartment can see the view of the front field through the windshield 12 without substantially having the view divided by the reflection portions 20, and the vehicle occupant can also see the superimposed display image which is constituted by the image light reflected by the plurality of reflection portions 20.

Since the width WDh and the interval SPh of the plurality of reflection portions 20 are dimensions that are defined based on a relationship with the minimum human pupil diameter, such dimensions are preferably determined as the dimensions perpendicularly defined relative to a viewing direction of the vehicle occupant. However, in the present embodiment, such dimensions are defined along the lateral dimension along the glass surface of the windshield 12. This is because the width WDh is observed as 2 mm or smaller in any viewing angle/direction for the vehicle occupant even though the viewing direction of the vehicle occupant may vary, i.e., may or may not be perpendicular to the glass surface of the windshield 12, when the dimension of the width WDh is defined as 2 mm or smaller on the grass surface. Further, this is also because a ratio between the width WDh and the interval SPh always takes the same value regardless of the viewing direction of the vehicle occupant.

As mentioned above, according to the present embodiment, since the plurality of reflection portions 20 are arranged along the lateral direction of the windshield 12, a superimposed display image is displayed on the windshield 12 by reflecting an image light from the image projection device 18 on the plurality of reflection portions 20. Further, since the plurality of reflection portions 20 are arranged on the windshield 12 with the interval SPh along the lateral direction interposed therebetween, and, the width WDh of the reflection portion 20 along the lateral direction is defined to be equal to or less than 2 mm based on the minimum size of the human pupil diameter which is about 2 mm in a light (i.e., bright) place, and the interval SPh between the plurality of reflection portions 20 is defined to be equal to or greater than the width WDh of the reflection portion 20. Therefore, the view of the vehicle occupant who is viewing the front field through the windshield 12 is ensured.

(Second Embodiment)

Next, the second embodiment of the present disclosure is described. The present embodiment mainly describes a different point from the above-described first embodiment. Therefore, the same part or the equivalent as the above-described embodiment is omitted from the present embodiment, or simplified for the brevity of description. The same applies to the description in the third embodiment.

Figure 2:
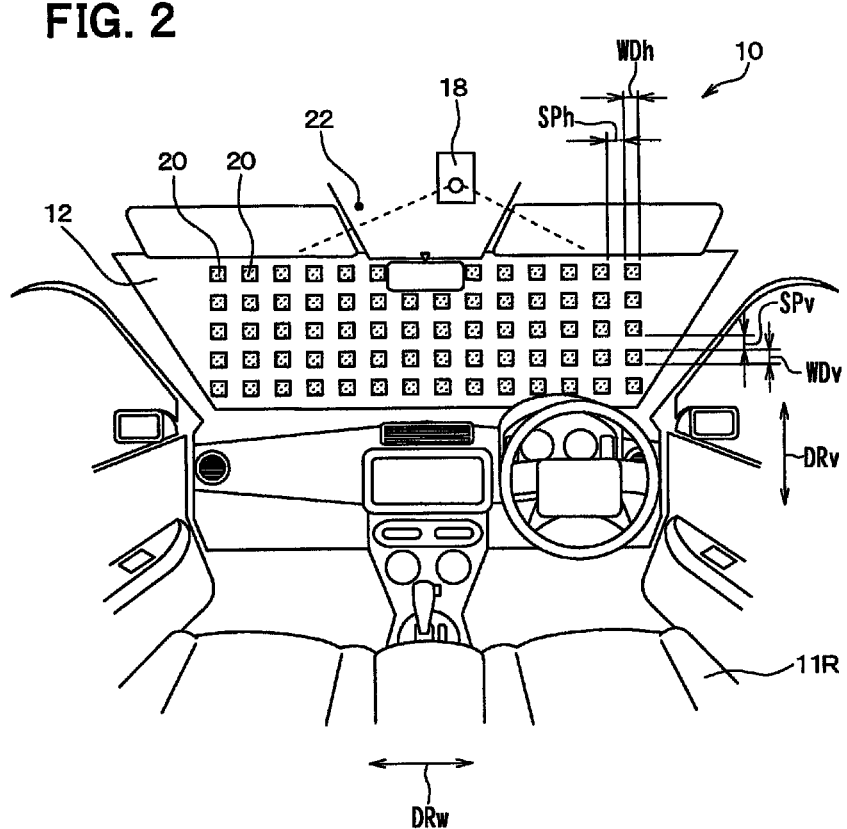
FIG. 2 is an illustrated configuration of a projection type display device in a second embodiment of the present disclosure, which also illustrates a view from the inside of the vehicle compartment toward the front field.

FIG. 2 is an illustration of the outline configuration of the projection type display device 10 in the second embodiment, together with a view of a front field, i.e., a view from an inside of a vehicle compartment toward a front field of the vehicle. As shown in FIG. 2, unlike the above-described first embodiment, the plurality of reflection portions 20 in the present embodiment respectively have a square shape or a near-square rectangular shape.

Further, similar to the first embodiment, the plurality of reflection portions 20 are arranged with the interval SPh along the lateral direction of the windshield 12. In the lateral direction of the windshield 12, the width WDh and the interval SPh of the plurality of reflection portions 20 are defined in the same manner as the first embodiment.

Further, in the present embodiment, the plurality of reflection portions 20 are also arranged along the vertical direction of the windshield 12, with the interval SPv interposed therebetween. In other words, the plurality of reflection portions 20 are separated by a vertical interval along the vertical direction of the window. More concretely, a width WDv of the reflection portion 20 along the vertical direction of the windshield 12 is defined as 2 mm or less. Further, an interval SPv between the reflection portions 20 along the vertical direction is equal to or greater than the width WDv of the reflection portions 20. These dimensions are defined based on the same reasoning as the width WDh and the interval SPh described above.

Figure 3:
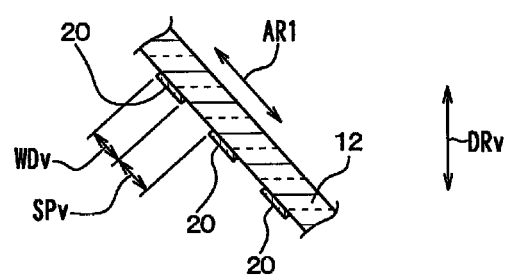
FIG. 3 is a sectional view of a windshield of a vehicle in FIG. 2, which is taken as a view from a lateral direction of the vehicle.

Further, each of the width WDv and the interval SPv of the plurality of reflection portions 20 is preferably defined as a perpendicular dimension relative to the viewing direction of the a vehicle occupant, similar to the width WDh and the interval SPh described above. However, in the present embodiment, based on the same reasoning as that of the width WDh and the interval SPh described above, those dimensions are defined as the above-described vertical direction size along the glass surface of the windshield 12, as shown in the sectional view of the windshield 12 in FIG. 3. An arrow AR1 in FIG. 3 represents the lateral direction of the windshield 12.

According to the present embodiment, the plurality of reflection portions 20 have the width WDh and the width WDv are defined similar to the first embodiment, and, the interval SPh and the interval SPv are defined similar to the first embodiment between the plurality of reflection portions 20. Therefore, a superimposed display image is displayed on the windshield 12 similar to the first embodiment, while sufficiently ensuring the view of the vehicle occupant who sees the front field through the windshield 12.

(Third Embodiment)

Next, the third embodiment of the present disclosure is described. The present embodiment mainly describes a different point from the above-described second embodiment.

Figure 4:
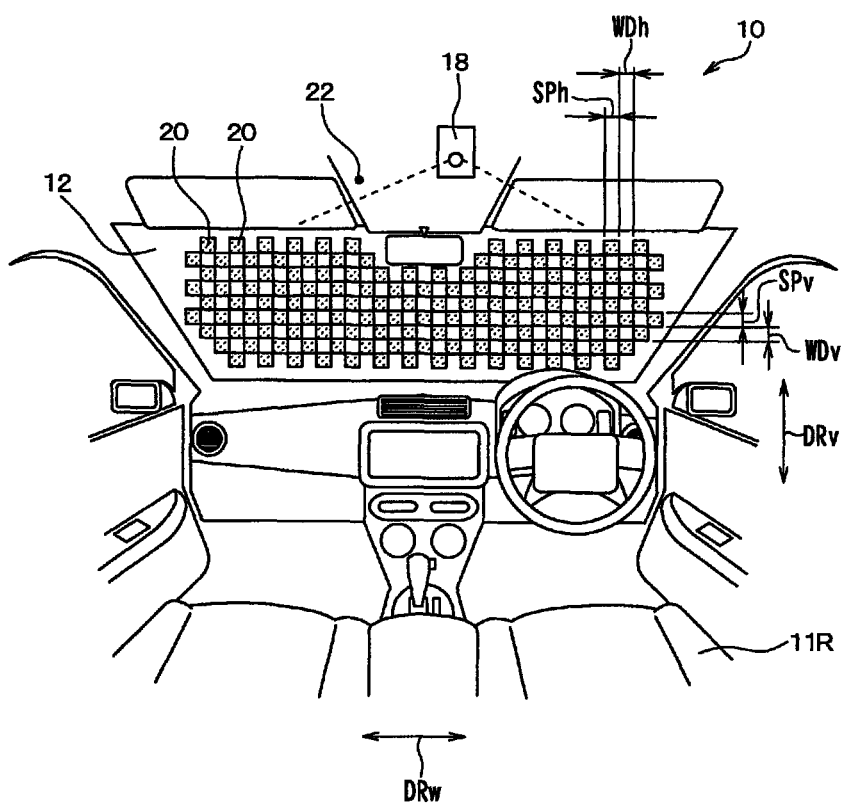
FIG. 4 is an illustrated configuration of a projection type display device in a third embodiment of the present disclosure, which also illustrates a view from the inside of the vehicle compartment toward the front field.

FIG. 4 is an illustration of the outline configuration of the projection type display device 10 of the third embodiment, together with a view of a front field, i.e., a view from an inside of a vehicle compartment toward a front field of the vehicle. As shown in FIG. 4, the plurality of reflection portions 20 in the present embodiment have the same shape as the second embodiment, the arrangement of the reflection portions 20 is different from the second embodiment. More specifically, the plurality of reflection portions 20 are arranged in a checker pattern, as shown in FIG. 4.

Although the arrangement of the plurality of reflection portions 20 according to the present embodiment differs from the one in the second embodiment, the widths WDh and WDv and the intervals SPh and SPv of the plurality of reflection portions 20 are the same as that of the second embodiment. Therefore, a superimposed display image is displayed on the windshield 12 similar to the second embodiment, while sufficiently ensuring the view of the vehicle occupant who sees the front field through the windshield 12.

Further, the display scheme of the present embodiment may be combined with at least one of the above-described first and second embodiments.

(Other Embodiments)

(1) The plurality of reflection portions 20 in each of the above-described embodiments are attached onto a compartment side (i.e., inside) surface of the windshield 12. However, the reflection portions 20 may be attached onto the outside surface of the windshield 12. When the windshield 12 is a pair glass window, a laminated glass, or the like, the reflection portions 20 may be positioned between a pair of glasses.

Figure 5:
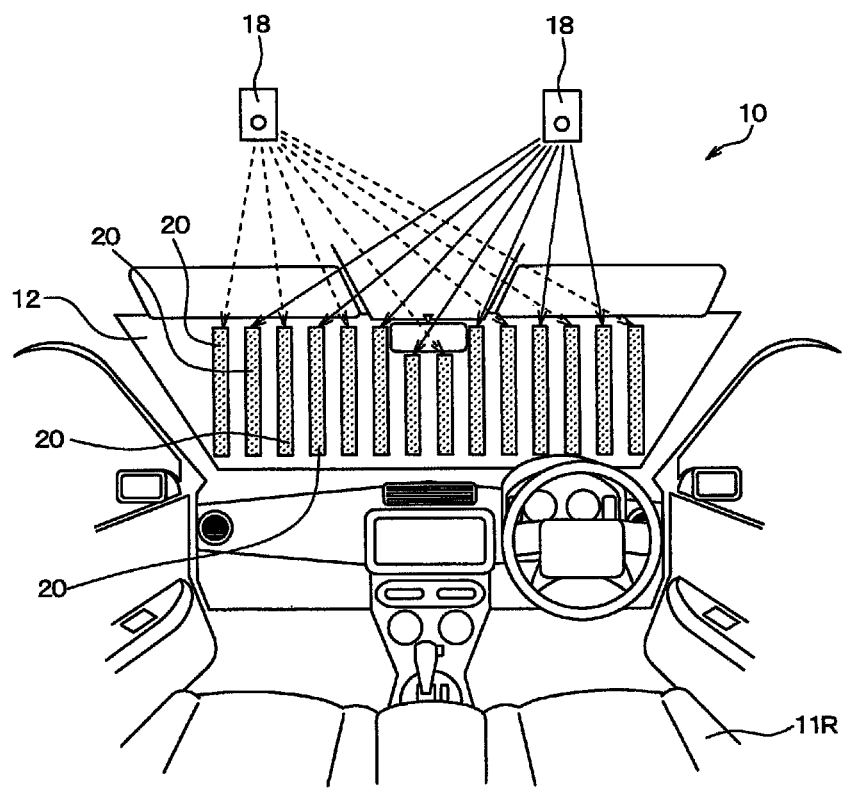
FIG. 5 is an illustrated configuration of a projection type display device in a fourth embodiment of the present disclosure, which also illustrates a view from the inside of the vehicle compartment toward the front field.

(2) In the first embodiment, the projection type display device 10 has only one image projection device 18. However, as shown in FIG. 5, for example, the projection type display device 10 may have two image projection devices 18.

The projection type display device 10 having two image projection devices 18 in FIG. 5 may be configured in the following manner. That is, one of the two image projection devices 18 may project an image light onto every other one of the plurality of reflection portions 20 on the windshield 12 along the lateral direction, for example, and the other one of the two image projection devices 18 may project an image light onto the rest of the plurality of reflection portions 20, i.e., the reflection portions 20 onto which the first image projection device 18 does not project the image light.

Further, the plurality of reflection portions 20 receiving the image light from the first image projection device 18 may reflect the image light towards one of the two eyes of the driver who is sitting on a driver's seat 11R, and the other reflection portions 20 receiving the image light from the second image projection device 18 may reflect the image light towards the other one of the two eyes of the driver. For the reflection of the image light in the above-described manner, the plurality of reflection portions 20 may be made from a prism array, for example. When the reflection portions 20 are made from the prism array, the driver's respective eyes may be provided with different image lights, thereby recognizing an image in three-dimensional perspective.

(3) In each of the above-described embodiments, the plurality of reflection portions 20 is made from a diffuse reflection material. However, the light reflection characteristics of the plurality of reflection portions 20 may be different from the diffusive characteristics. For example, when the image projection device 18 is disposed to project the image light onto the windshield 12 substantially in the same direction as a viewing direction of a driver on the driver's seat 11R (FIG. 1), the plurality of reflection portions 20 may have retro-reflective characteristics. In other words, the image projection device 18 may be disposed at a position above the driver's seat 11R to project the image light onto the plurality of reflection portions 20, and the plurality of reflection portions 20 may be made from the retro-reflective material.

When having the above configuration, the image light reflected by the plurality of reflection portions 20 toward the image projection device 18 easily reaches the driver's eyes. The plurality of reflection portions 20 may be made from, for example, a bead-type material, a prism-type material, or a corner-cube-type material for the retro-reflection of the image light.

(4) In each of the above-described embodiments, the plurality of reflection portions 20 are made from the diffuse reflection material, and the light reflection characteristics are the same among the plurality of reflection portions 20. However, the light reflection characteristics may be respectively different among the plurality of reflection portions 20. For example, the reflection portions 20 may be configured to reflect the image light toward a specific area in the vehicle compartment upon receiving the image light from the image projection device 18. When the light reflection characteristics are different among the plurality of reflection portions 20, the plurality of reflection portions 20 may be made from the prism array, for example. Further, the specific area described above may include a position of the driver's eyes of the driver on the driver's seat 11R, for example.

(5) In each of the above-described embodiments, the image projection device 18 projects the image light onto the windshield 12. However, the image light may be selectively projected only onto the plurality of reflection portions 20 on the windshield 12. More specifically, the image projection device 18 may project the light onto the reflection portions 20 without projecting the light onto a portion of the windshield 12 between the two adjacent reflection portions 20, where no reflection portion 20 exists. In such manner, a spill of the image light projected by the image projection device 18 toward an outside of the vehicle is prevented.

(6) In each of the above-described embodiments, the projection type display device 10 displays a superimposed display image on the windshield 12. However, the superimposed display image may also be displayed on any window which constitutes a vehicle compartment of the vehicle.

(7) In each of the above-described embodiments, the projection type display device 10 is used to superimpose an image onto the scene outside of the vehicle which is visible through the windshield 12. However, the projection type display device 10 may be used for purposes other than superimposing an image.

(8) In each of the above-described embodiments, the image projection device 18 is implemented as a laser projector which emits a laser beam. However, the image projection device 18 may be a projector of other type, such as a liquid crystal projector, or the like.

(9) In each of the above-described embodiments, the plurality of reflection portions 20 respectively has a rectangular shape. However, the shape of the reflection portions 20 may be other than the rectangular shape. That is, the shape of the reflection portions 20 may be a circular shape, an oval shape or the like.

Although the present disclosure has been fully described in connection with preferred embodiment thereof with reference to the accompanying drawings, it is to be noted that various changes and modifications will become apparent to those skilled in the art, and such changes, modifications, and summarized scheme are to be understood as being within the scope of the present disclosure as defined by appended claims.

In each of the above-described embodiments, the components in those embodiments may be not necessarily an indispensable one, except for the case in which it is explicitly described as necessary or except for the case in which it is absolutely necessary in pertaining principles. Further, in each of the above-described embodiments, regarding the number, i.e., the number of those components, as well as the value, the amount, the range and the like, the number is not limited to a specific one mentioned in the embodiments, except for the case in which it is explicitly described as limited to such number or except for the case in which it is absolutely necessary to have such number based on pertaining principles. Furthermore, in each of the above-described embodiments, the material, the shape, the positional relationship and the like are not limited to a specific one mentioned in the embodiments, except for the case in which it is explicitly described as limited to such material/shape/positional relationship or except for the case in which it is absolutely necessary to have such material/shape/positional relationship based on pertaining principles.

What is claimed is:

1. A projection type display device for displaying an image on a window of a vehicle compartment, the projection type display device comprising:
    a plurality of reflection portions arranged on the window and reflecting a light, and the plurality of reflection portions being separated by a lateral interval interposed between the plurality of reflection portions; and
    an image projection device projecting an image light for displaying an image on the plurality of reflection portions, wherein
    each of the plurality of reflection portions has a lateral width equal to or less than 2 mm, and
    the lateral interval between the plurality of reflection portions is equal to or greater than the lateral width of each of the plurality of reflection portions.

2. The projection type display device of claim 1, wherein
    the image light projects the image of the projection type display device on the window,
    the image displayed on the window is relevant to a scene outside of a subject vehicle that is visible through the window, and
    the image displayed on the window is superimposed on the scene outside of the subject vehicle that is visible through the window.

3. The projection type display device of claim 1, wherein the plurality of reflection portions have a rectangular shape in which a longer side of the rectangular shape is aligned with a vertical direction of the window.

4. The projection type display device of claim 1, wherein the plurality of reflection portions are separated by a vertical interval along the vertical direction of the window.

5. The projection type display device of claim 4, wherein
    a vertical width of each of the plurality of reflection portions along the vertical direction is equal to or less than 2 mm, and
    the vertical interval along the vertical direction is equal to or greater than the vertical width of each of the plurality of reflection portions along the vertical direction.

6. The projection type display device of claim 4, wherein the plurality of reflection portions are arranged in a checker pattern on the window.

7. The projection type display device of claim 1, wherein the image light from the image projection device is selectively projected onto the plurality of reflection portions on the windshield.

8. The projection type display device of claim 1, wherein the window is a front windshield and the plurality of reflection portions is disposed on the front windshield.

9. The projection type display device of claim 1, wherein the plurality of reflection portions are made from a diffuse reflection material that diffusively reflects the light.

10. The projection type display device of claim 1, wherein
    the plurality of reflection portions are made from a retro-reflective reflector that retro-reflects the light, and
    the image projection device projects the image light onto the plurality of reflection portions from an upper position of a driver's seat in the vehicle compartment.

11. The projection type display device of claim 1, wherein
    light reflection characteristics among the plurality of reflection portions are respectively different, and
    the plurality of reflection portions is configured to reflect the image light toward a specific area in the vehicle compartment.

12. The projection type display device of claim 1, wherein the lateral width of each of the plurality of reflection portions is less than a minimum size of a human pupil diameter.

13. The projection type display device of claim 1, wherein the lateral width of each of the plurality of reflection portions appears transparent to a vehicle occupant when the plurality of reflection portions are attached to a window.

14. The projection type display device of claim 1, wherein the lateral width of the plurality of reflection portions prevents the window of the vehicle from appearing divided to a vehicle occupant.

* * * * *